(12) United States Patent
Yang

(10) Patent No.: US 11,634,069 B2
(45) Date of Patent: Apr. 25, 2023

(54) CONNECTED VEHICLE LOCATION TRACKING IN TAILLIGHT

(71) Applicant: Xing Yang, Vaughan (CA)

(72) Inventor: Xing Yang, Vaughan (CA)

(*) Notice: Subject to any disclaimer, the term of this patent is extended or adjusted under 35 U.S.C. 154(b) by 0 days.

(21) Appl. No.: 17/211,570

(22) Filed: Mar. 24, 2021

(65) Prior Publication Data

US 2022/0169172 A1   Jun. 2, 2022

Related U.S. Application Data

(60) Provisional application No. 63/005,601, filed on Apr. 6, 2020.

(51) Int. Cl.
*B60Q 1/50* (2006.01)
*G01C 21/00* (2006.01)
*B60Q 1/54* (2006.01)

(52) U.S. Cl.
CPC .............. *B60Q 1/525* (2013.01); *B60Q 1/54* (2013.01); *G01C 21/3874* (2020.08); *G01C 21/3896* (2020.08)

(58) Field of Classification Search
CPC ...... B60Q 1/525; B60Q 1/54; G01C 21/3874; G01C 21/3896
See application file for complete search history.

(56) References Cited

FOREIGN PATENT DOCUMENTS

| CN | 107464961 A | * | 12/2017 | |
|---|---|---|---|---|
| CN | 207880743 U | * | 9/2018 | |
| JP | 2006011770 A | * | 1/2006 | |
| WO | WO-2021133408 A1 | * | 7/2021 | ........... H01Q 1/3275 |

* cited by examiner

*Primary Examiner* — Daryl C Pope

(57) ABSTRACT

The present disclosure provides methods and apparatuses of a highly sensitive and reliable IoT location tracking device in a form factor of a vehicle taillight. The tracking device replaces the existing taillight and comprises custom-designed GPS and Cellular antennae that are specially integrated with a novel dual-PCBA structure and an anti-theft tactile switch detection mechanism. The purposes of the new methods and apparatuses are to achieve the following: (1) improved reliability of signal reception and transmission with taillight integration; (2) improved electronic shielding of the processor board and PCB (printed circuit board) assembly; (3) high sensitivity of the new GPS and cellular antennae geometry and dimension design; (4) novel anti-theft security and better vehicle tracking management.

20 Claims, 6 Drawing Sheets

CONNECTED VEHICLE LOCATION TRACKING IN TAILLIGHT

CROSS-REFERENCE TO RELATED APPLICATION

This application claims the benefit of U.S. Provisional Patent Application No. 63/005,601, filed Apr. 6, 2020. The entire disclosure of the above application is incorporated herein by reference.

FIELD

The present disclosure is in the field of electronics, electrical engineering, automobile lighting systems and devices, taillight, IoT (Internet of Things), vehicle tracking systems, cellular systems, GPS (Global Positioning System), PCBs (printed circuit boards), RF (radio frequency) antennae, vehicle security, and especially, a wirelessly-connected IoT vehicle location tracking device in an anti-theft taillight form factor with custom-designed antennae and their integration.

BACKGROUND

Trucks and commercial trailers are widely used in the transportation industry. Because they often change their locations, there is a need to track and plan their locations for better transportation resource management and scheduling. To efficiently and actively keep track of these vehicles requires a means of detecting and transmitting the geographic location of the vehicle from a local sensor/tracker device to a central processing and managing system. This is also known as an automatic vehicle location tracking system. Such a system is considered an Internet of Things (IoT) system. The sensor/tracker device is an IoT device.

However, there are several general requirements or challenges in designing and installing an IoT vehicle location tracking system: (1) the local sensor/tracker device should not be physically intrusive after its installation; (2) the device needs to have a constant and highly available power supply. This means it at least needs a built-in battery and a battery charger. A primary source of the charger is from the vehicle battery and its electrical generator; (3) the device requires reliable wireless communication reception and transmission; (4) it requires the sensors to be sensitive and accurate; (5) the device needs to be able to tolerate severe temperature and environmental conditions and have low installation and maintenance costs; (6) the device needs to be easily identified during theft and/or damage; (7) the wireless connection needs to be protected from cyberattacks and data loss.

Vehicle location tracking combines automatic vehicle location updating with software to manage the vehicle information and view that information in digital maps via the Internet. This is most commonly done with a GPS (Global Positioning Systems) receiver device integrated into the vehicle; the vehicle location and other motion information can then be sensed and represented by the GPS coordinates of the vehicle. There are two types of vehicle tracking: passive tracking and active tracking. In passive tracking, information is initially collected and stored on the device and later transferred from the vehicle to the central managing system, like a computer or server. In active tracking, the sensor/tracker device collects vehicle location information and transmits the information in real-time through a cellular, Wi-Fi, or satellite network.

The architecture of an active GPS-based tracking system consists of three main components: a GPS sensor, a tracking server, and user interface software. GPS SENSOR: The active tracking device is equipped with a GPS sensor, and the device (tracker) is fitted onto a vehicle. It captures the location information and other relevant information regularly at a fast updating rate, which the sensor then sends to a server; TRACKING SERVER: The server is responsible for the following: 1) receives location data from the GPS sensor and tracking unit; (2) securely processes and stores it; (3) provides information to the user in real-time; USER INTERFACE SOFTWARE: The software interface plays a role in letting the user access the information, visualize it, process the data, and make management and scheduling decisions.

The GPS-based vehicle tracking system is an IoT (Internet of Things) system. Its tracker devices enable each vehicle to be a part of the IoT network. A typical IoT system consists of interrelated electronic devices, where each device is provided with an identifier and can transfer data over a communication network. In the case of trucks and commercial trailers IoT, devices with the GPS-based tracker can be applied to each vehicle to monitor its location and condition in real-time and send the data via a wireless connection channel. An example of this wireless connection channel is most often from a cellular network. Based on the information provided, a better decision and/or more efficient plan for how and when to use the vehicle can be made automatically or manually. Examples of the cellular network include GSM, CDMA, LTE, and 5G OFDMA. For simplicity and without loss of generality, the terms cellular network, LTE, LTE-M, GSM, and Cellular are used interchangeably.

For a truck and trailer IoT location tracking system containing the local sensor/tracker device with GPS-based tracking and cellular data connection, there are two additional challenges with all the existing solutions: first, the GPS receiver needs to obtain satellite signals reliably; second, the tracker device must always maintain good communication with cellular base stations. It is difficult for existing solutions to maintain a good reception of both the GPS satellite and cellular signals after they are installed onto the vehicles.

The existing solutions involve integrating the tracking circuitry into a vehicle's taillight. The GPS receiver and antenna are hidden inside the LED taillights and connect the device to the automotive wire harness. The taillights are automotive light devices at the rear of a vehicle. Like other forms of vehicle lighting, they are used to increase the vehicle's visibility and transmit braking signals to others in the surrounding area (i.e., other vehicles and pedestrians). They are traditionally made using incandescent lighting; however, LED (Light Emitting Diode) lights have been recently used for these lights since they last longer and save energy.

The present disclosure focuses on taillights for trucks and trailers. With a truck, the battery of the vehicle supplies the taillights with electrical power. On the other hand, a trailer does not have a battery. Its taillights could be powered by a harness containing connectors and wires that connect the trailer to the bumper of a truck or any other vehicle that has a built-in battery. That is, the tracking device installed on a trailer can only be charged with electrical power when it is hitched to a truck. Once the trailer is disconnected from the truck, the tracking device will lose the input power but can still use its own battery. It will be completely dead after its on-board battery runs out; however, this is sufficient enough for tracking the trailer. If the trailer is still linked with a truck, the tracking device will always have enough power to operate, and the trailer's location can be tracked properly. Once the truck disconnects from the trailer for drop-off, the trailer is no longer able to move. As a result, the most updated GPS location of the trailer, until the on-board battery runs out, should be the exact location where the trailer remains. Since the trailer can not move until it is hooked to the truck again, it does not need further location updates from the GPS tracking device installed on the trailer.

In the form factor mentioned above, the tracking solution satisfies most of the general design requirements of the vehicle location tracking system, which includes the following: the tracker is not intrusive and not immediately noticeable to people; the device draws power to charge the battery via the vehicle harness cable; the device can tolerate external environmental weather conditions; low cost to install and maintain; the GPS and cellular signals are unblocked and available.

However, there are several main problems with the existing methods. First, the GPS and cellular antennae are often enclosed inside the vehicle's metal bracket or chamber for mounting the taillight. This placement often leads to bad reception or transmission for both GPS satellite and cellular signals because the metal chamber blocks the open exposure to the signals. The existing GPS and cellular antennae are not sensitive enough to maintain a reliable connection. Second, as the signal processing circuitry is situated close to the semi-transparent lamp cover, the printed circuit board (PCB) and IC chips for the RF (radio frequency) and digital signal processing often are not electronically shielded sufficiently. It may be subject to electronic interference. Although one can add additional shield parts to the PCB, it will easily increase the product design complexity and manufacturing cost. Third, its easy installation and replacement also mean the device can be easily disconnected or stolen. Vehicle users or thieves could easily unplug the taillight and drive off with the vehicle to disrupt the tracking mechanism and safety management. This failure as a result of a security breach is difficult to identify, debug, and fix from the service provider's point of view. For example, a theft event often cannot be distinguished from other device failures (e.g., empty battery, bad signal connection, etc.). Overall, the existing problems result in the location tracking devices being less sensitive, less reliable, and less secure, which may cause the tracking system to partially or entirely malfunction.

The fourth problem or challenge is to design highly sensitive GPS and cellular antennae that also fit very well with the existing taillight enclosure. Each antenna is a device designed to receive and amplify the radio signals transmitted at specific frequencies and convert them to an electronic signal for use by a receiver. The radiofrequency (RF) signal is in the form of an alternating electric current or voltage. It can also be a magnetic, electric, or electromagnetic field, or even a mechanical system within a frequency range of around 20 kHz to around 300 GHz. The antenna mainly receives signals from GPS satellites and wireless cellular networks such as 3G, 4G, LTE, and 5G networks; these networks are based on the 3G/4G/LTE/5G and IoT requirements. There are also some challenges with the antenna's integration. First, it needs to maintain a higher sensitivity to radio signals for better performance. This sensitivity is determined by the antenna gain, which in the case of a receiving antenna, is how well the antenna converts radio waves into electrical signals. If the antenna is more sensitive, it can pick up weaker RF signals and convert them into strong electrical currents or voltage. Therefore, an antenna with higher sensitivity is the one that has a higher gain. Second, the antenna needs to have a small footprint it should be flexible, small, and can fit in the taillight box and/or be placed outside of the taillight cover.

The present disclosure provides new designs of a highly sensitive and reliable IoT location tracking device in an anti-theft taillight form factor with custom-designed antennae and their integration, as well as the associated wireless connection system. The new methods improve upon the existing GPS-based taillight location tracking device designs mainly by (1) custom-designed, high-sensitivity GPS and cellular antennae; (2) novel mechanic structural design of the antennae placement for the reliable RF signal reception and transmission; (3) new PCBA (printed circuit board assembly) design and arrangement for better electrical performance of the product; (4) an anti-theft mechanism to improve the system safety and overall vehicle location tracking system functionality and performance.

SUMMARY

The present disclosure provides methods and apparatuses of a highly sensitive and reliable IoT location tracking device in a form factor of a vehicle taillight. The tracking device replaces the existing taillight and comprises custom-designed GPS and cellular antenna that are specially integrated with a novel dual-PCBA structure and an anti-theft tactile switch detection mechanism. The purposes of the new methods and apparatuses are to achieve the following: (1) improved reliability of signal reception and transmission with taillight integration; (2) improved electronic shielding of the processor board and PCB (printed circuit board) assembly; (3) high sensitivity with the new geometrical designs of the GPS and cellular antennae; (4) novel anti-theft security and better vehicle tracking management.

The design comprises an IoT location tracking system and its related software. The tracking system comprises the following components in the order from the external side of a vehicle taillight to the internal: a taillight housing cover, cellular and/or GPS antenna, lighting board, built-in battery pack, signal processing board, anti-theft tactile switch, taillight housing, and socket for the harness connector. The IoT location tracking system includes a group of IoT location tracking devices attached to the vehicle, wireless communication channels like cellular connection, and a central processing server. The IoT location tracking device is sized and configured to fit the taillight's metal mounting bracket of the trucks and trailers. The cellular and GPS antenna are made of FPC (flexible printed circuit) material and technology in an exemplary embodiment of the present disclosure. The lighting board houses the taillight LED lights. The built-in battery pack provides stored electrical power to the device if it is disconnected from the vehicle power harness. The separate signal processing board is located deep within the taillight mounting bracket behind the battery pack. The signal processing board connects to the forefront antennae through coaxial cables. All the components are held inside the plastic housing. The tactile switch is located below the socket, which also connects to the lighting board along the sidewalls of the housing. The socket for receiving the vehicle's internal wire harness connector is located inside the base of the housing.

The reliability of the GPS and cellular signal reception and transmission are greatly improved by relocating both FPC antennae as outwardly as possible within the metal bracket. Since the cellular FPC antenna is flexible and slim, it can be put in the topmost position that is just under the taillight housing cover. The cellular antenna module is placed on the LED lighting board. While in another embodiment of the present disclosure, the FPC cellular antenna is also placed just below or even inside the taillight housing cover. The relocation of both FPC antennae reduces or even eliminates the signal blocking caused by the taillight bracket. Therefore, it improves the satellite and cellular signal reception and/or transmission performance and reliability.

Compared to previously existing designs, a design using two separate PCB assemblies is employed: the LED lighting board assembly (LED PCBA) is separated from the RF and digital signal processing board (processor PCBA). The LED PCBA is placed in front of the processor PCBA. Contrary to the LED PCBA, the processor PCBA requires shielding from any electronic or RF interference. By relocating the processor PCBA behind both the LED PCBA and the built-in battery chamber, the processor PCBA achieves optimal shielding from external electromagnetic interference. Therefore, signal processing can achieve the best performance.

Also, the new designs of the FPC cellular and GPS antenna make the installation easier. The LED PCBA's circumference matches the design of the antenna, and there is a designated frame on the LED PCBA that provides a guide for the placement of the cellular antenna ground plane. Overall, the antenna and signal groundings are improved.

The high sensitivity is achieved by redesigning the geometry, shape, and dimensions of the GPS and cellular antennae. In one preferred embodiment of the present disclosure, the flexible FPC antennae for the cellular and GPS antenna have particular measurements to optimize their sensitivity to radio frequency signals. For the cellular antenna, some of the key measurements include: the length of the antenna is about 102 mm; the dimension of the ground plane is about 16 mm by 20 mm; the length of the short strip is about 10.8 mm; the inner gap is about 2.2 mm; the widths of long and short strips are between 1.3 and 1.5 mm. For the GPS antenna, some of the key measurements include: the length of the antenna is about 24.5 mm; the width of the antenna is about 13.5 mm; the inner gap is about 0.9 mm; one length of the sub-patch for the signal is about 14.5 mm; one length of the sub-patch for grounding is about 9.0 mm.

Last, the tactile switch near the taillight socket aids in adding security to the truck or trailer and the IoT location tracking system. This tactile switch is connected to the taillight socket and vehicle harness wire plug with a spring. Each time the device gets removed from the taillight bracket, the tactile switch detects the action and sends an event signal to the remote cloud server. This anti-theft feature not only improves the vehicle and trailer security but also adds to the management functionalities of the overall vehicle location tracking system.

DETAILED DESCRIPTION

Figure 1:
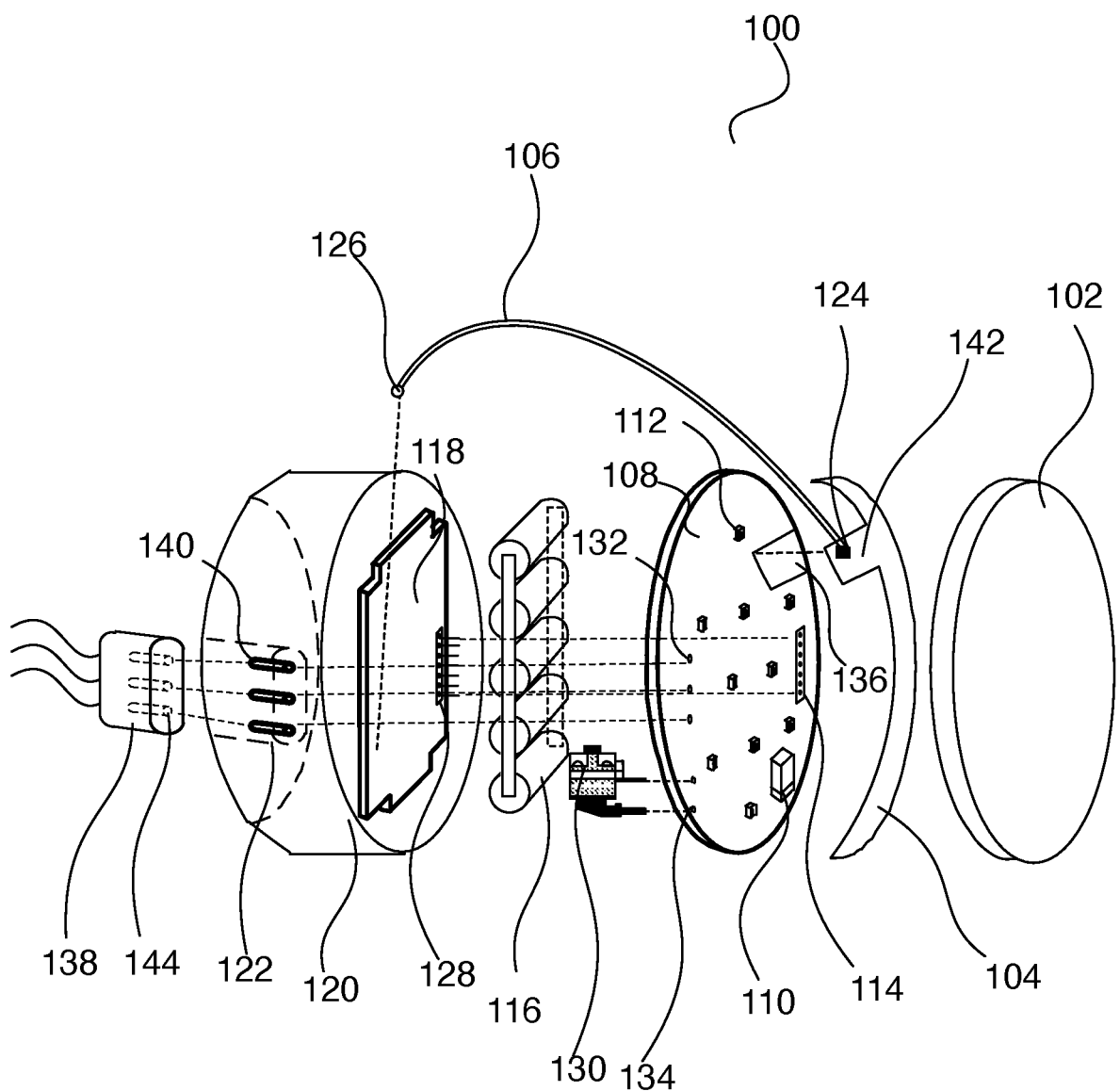
FIG. 1 illustrates a perspective exploded view of the assembly components of the preferred embodiment of an IoT vehicle location tracking taillight in the present disclosure.

The language employed herein only describes particular embodiments; however, it is not intended to be limited to the specific embodiments of the disclosure. Within the disclosure, the term "and/or" includes any and all combinations of one or more associated items. Unless indicated, "a", "an", and "the" can encompass both the singular and plural forms within the disclosure. It should also be noted that "they", "he/she", or "he or she" are used interchangeably because "they", "them", or "their" are now considered singular gender-neutral pronouns. The terms "comprises" and/or "comprising" in this specification should specify the presence of stated features, steps, operations, elements, and/or components; however, they do not exclude the presence or addition of other features, steps, operations, elements, components, and/or groups. Unless otherwise defined, all terminology used herein, including technical and scientific terms, have the same definition as what is commonly understood by one ordinarily skilled in the art, typically to whom this disclosure belongs. It will be further understood that terms, such as those defined in commonly used dictionaries, should be interpreted as having the same meaning as defined in the context of the relevant art and the present disclosure; such terms will not be construed in a romanticized or overly strict sense unless explicitly described herein. It should be understood that multiple techniques and steps are disclosed in the description, each with their own individual benefit. Each technique or step can also be utilized in conjunction with a single, multiple, or all of the other disclosed techniques or steps. For clarity, the description will avoid repeating each possible combination of the steps unnecessarily. Nonetheless, it should be understood that such combinations are within the scope of the disclosure and the claims.

In the following description, specific details are mentioned to give a complete understanding of the present disclosure. However, it may likely be evident to one ordinarily skilled in the art; hence, the present disclosure may be applied without the mention of these specific details. The present disclosure is represented as one realization; however, the disclosure is not necessarily limited to the specific embodiments illustrated by the figures or description below. The description of the present disclosure will now be interpreted by specifying the appended figures representing preferred or alternative embodiments.

The present disclosure provides methods and apparatuses of a highly sensitive and reliable IoT location tracking device in a form factor of a vehicle taillight. The tracking device replaces the existing taillight and comprises custom-designed GPS and cellular antennae that are specially integrated with a novel dual-PCBA structure and an anti-theft tactile switch detection mechanism. The purposes of the new methods and apparatuses are to achieve the following: (1) improved reliability of signal reception and transmission with taillight integration; (2) improved electronic or RF shielding of the processor board and PCB (printed circuit board) assembly; (3) high sensitivity with the geometrical designs of the GPS and cellular antennae; (4) novel anti-theft security and better vehicle tracking management. For reference, the term RF shielding is interchangeable with electronic shielding.

There are several reasons why it is a good idea to install the IoT location tracking device into the vehicle' taillight fixture. These address the general requirements of such a vehicle location tracking device and system. First, the tracking device replaces the vehicle's taillight completely. Therefore, the installed device is not physically intrusive and immediately noticeable to people. This often means a better external appearance to the vehicle and the safety of the installed device. Second, the device can better tolerate several external environmental and weather conditions, like rain, snow, and strong winds. Third, it can also make the device installation easy and keep repair costs low. Because the taillight fixtures are readily designed and manufactured for all vehicles and trailers, there is no need to design and install an additional mounting fixture for the tracking device for different models of the trucks and trailers. The maintenance is also made easy by just replacing the whole taillight instead of diagnosing and fixing a specific electronic part. Fourth, since the tracking device is inside the taillight bracket, the device can now easily draw power from the vehicle harness cable completely inside the vehicle. So, there is no need for wires to hang outside the vehicle body or some other location. Though most of the tracking device embodiments of the present disclosure will have their own built-in battery pack, the device can be powered directly from the vehicle power supply. The built-in battery will be charged when the vehicle's power is available. Once the vehicle's power is off, either from the vehicle being turned off or the device being disconnected, the device can still run normally on battery power until it is depleted. This scheme is sufficient because a truck only needs to be tracked if it moves and changes its location(s) and the device always has power as long as the truck is running. The device might still lose electricity once the engine is shut off, and its own built-in battery happens to be malfunctional. However, the tracking device does not need to be active at this moment since its current location is already recorded and will not change until the truck's engine starts again. At that point, the tracking device can instantly regain power. A similar situation can occur with a trailer. Every time a trailer is disconnected from its pulling vehicle, the trailer loses power. Therefore, the tracking device inside the trailer taillight also loses power. However, the current trailer's location is already known to the tracking system. Although still operational with its built-in charged battery, the tracking device no longer needs additional power. Once the trailer is pulled by another vehicle and regain power for the taillights, the device can also regain power and resume tracking.

To address the additional requirements of the vehicle location tracking device and system mentioned previously, the design comprises an IoT location tracking system and its related software. The tracking system comprises the following components in the order from the external side of a vehicle taillight to the internal: a taillight housing cover, cellular and/or GPS antennae, lighting board, built-in battery pack, signal processing board, anti-theft tactile switch, taillight housing, and socket for the harness connector. The IoT location tracking system includes a group of IoT location tracking devices attached to the vehicles, wireless communication channels like cellular connection, and a central processing server. The IoT location tracking device is sized and configured to fit the taillight's metal mounting bracket of the trucks and trailers. Wherein the lighting board will be hereafter also called the LED board, LED PCBA interchangeably; the signal processing board will be hereafter called the processor board, processor PCBA interchangeably.

The cellular and GPS antennae are made of FPC (flexible printed circuit) material and technology in the preferred embodiment of the present disclosure. FPC usually consists of a flexible PCB material such as polyimide. A trace is printed on the substrate to obtain the desired antenna topology. With this in mind, various antenna types such as monopoles, dipoles, and printed F antennae can be made. The GPS antenna will hereafter be called the FPC GPS antenna. The cellular antenna will hereafter be called the cellular antenna, FPC cellular antenna interchangeably. The LED board houses the taillight LED lights. The built-in battery pack provides stored electrical power to the device if it is disconnected from the vehicle power harness. The separate processor board is located deep into the taillight mounting bracket and behind the battery pack. The processor board connects the forefront antennae through coaxial cables. All the components are held inside the plastic housing. The tactile switch is located below the socket and also connects to the lighting board along the sidewalls of the housing. The socket for receiving the vehicle's internal wire harness connector is located inside the base of the housing. For reference, the term harness connector is interchangeable with taillight connector.

The reliability of the GPS and cellular signal reception and transmission are greatly improved by relocating both the FPC GPS and cellular antennae as outwardly as possible within the metal bracket. In the preferred embodiment of the present disclosure, since the FPC cellular antenna is flexible and slim, it can be put in the topmost position just below the taillight housing cover. Also, the cellular antenna module is placed on the LED PCBA. While in an alternative embodiment of the present disclosure, the FPC cellular antenna can be placed just below or even in/on the taillight housing cover.

The relocation of both FPC antennae reduces or even eliminates the signal blocking caused by the taillight bracket or fixture. Therefore, it improves the satellite and cellular signal reception and/or transmission performance and reliability.

The FPC antennae should be all directed towards the open sky at the widest possible angle to receive high-frequency signals sent by the GPS satellite or cellular base station. The GPS signal data is used to calculate the geographical location of the vehicle. The Cellular signal is used for wireless communication to the Internet. All the FPC antennae should also be directed towards the open sky with the widest possible angle to maximize the reception.

Previous existing designs only could face the antennae almost parallel to the ground, which renders a narrow-angle that is very limited for the signal reception. Furthermore, being placed deep inside the metal mounting bracket also makes things worse; the metal bracket blocks most radio frequency signals from all other directions. The novel design in the present disclosure allows both the GPS and cellular antennae to extend outwards as far away from the bracket and as close to the taillight cover as possible. This means that there is no need to resort to an external antenna. By placing the GPS antenna on the front side of the LED PCBA, close to the taillight cover in the preferred embodiment, allows for increased sensitivity and enhanced reception of GPS and cellular signals. The RF signal received from the GPS antenna and receiving module is then sent to the chips on a separate processor PCBA as data through a mini coaxial cable. Similarly, the signal received from the cellular antenna and the RF preprocessing module is also sent to the circuitry on the processor PCBA through another mini coaxial cable.

In an alternative embodiment of the present disclosure, the GPS antenna is placed even closer to the cover. The GPS antenna is made of FPC material with adhesive on the back to attach to the taillight cover surface. By doing this, reception sensitivity to the GPS signal is further enhanced because the GPS antenna is placed almost outside of the metal bracket and is fully exposed to the sky. The size of the antenna and dimensions of the copper layer can also determine how sensitive the antenna is to the RF signals.

Compared to previously existing designs, a design with two separate PCBAs (printed circuit board assemblies) is used: the LED PCBA is separated from the processor PCBA. Separate PCBAs mean that some of the components, particularly the GPS and cellular antennae, can move outwards towards the front of the taillight for better reception. Data can still be relayed between components through a multiple-pin PCB connector. The PCB connector links the two boards together. The LED PCBA is placed in front of the processor PCBA. Unlike the LED PCBA, the processor PCBA needs to be shielded from any electronic or RF interference. By relocating the processor PCBA behind both the LED PCBA and built-in battery chamber, the processor PCBA and its components are placed deep inside the housing. Therefore, the processor PCBA achieves optimal shielding from external electromagnetic interference, and the signal processing achieves the best performance. The components on the processor PCBA do not need to be exposed to external radio frequencies or satellite signals, as they are suitable inside the housing. This is the key to the present disclosure to obtain better reception signals and data processing.

As noted before, the antenna is designed with FPC, which uses a flexible plastic material such as polyimide or conductive polyester. The materials of the flexible circuit include the base material or substrate layer (plastic or polyester), bonding adhesive, and metal (copper or aluminum) foil. This type of material is generally used in small electronics and wearable devices due to its ability to bend and save space. Thus, the antenna can be embedded inside the device.

The custom cellular and GPS antennae made of FPC (flexible printed circuit) material can be very compact, low profile, easy to install, highly reliable, affordable, and more sensitive to signals if a large enough surface area is present. A Cellular reception may range widely from 700 MHz to 2700 MHz, which can vary between regions or countries. This may be a challenge to cover all these frequencies with existing antenna designs, particularly if they are installed in an enclosed part of the vehicle. As a result, one or multiple external antennae may be needed. Thanks to the FPC antennae design, the cellular antenna can fit around the edge of the LED PCBA, while the GPS antenna can fit onto the taillight cover. As a result, the antennae designed in the present disclosure have increased sensitivity to radio frequency signals and can pick up sufficient signals within the taillight fixture. The attached coaxial cables act as a transmission line to conduct radiofrequency waves and transmit them to the processor PCBA. These cables can be bent and twisted through the taillight interior without affecting the actual transmission. Therefore, a compact design is possible without any interference with cellular signals.

The design of the antennae in the present disclosure also plays a key role in strengthening cellular signals through an increased sensitivity to radio waves from RF signals. A larger surface area and longer dimensions mean an increased sensitivity to those waves. More particularly, the dimensions of the conductive copper layer, as well as the general dimensions of the antennae, help enhance the sensitivity. Generally, a longer copper layer means increased sensitivity and receptiveness to RF signals. The cellular antenna in the present disclosure also has a large ground plane that directly attaches to the LED PCBA and provides a coupling ground wire connection. The ground plane reflects radio waves and serves as a return path for the current from the taillight's components. Additionally, it also helps with reducing electrical noise and interference. This connection improves the grounding performance of the cellular antenna, which contributes to improving the antenna's sensitivity reception of RF signals.

The increased sensitivity is achieved by redesigning the geometry, shape, and dimensions of the GPS and cellular antennae. In one preferred embodiment of the present disclosure, the flexible FPC antennae for the cellular and GPS antennae have particular measurements to optimize their sensitivity to the radio frequency signals. For the cellular antenna, some of the key measurements include: the length of the antenna is about 102 mm; the dimension of the ground plane is about 16 mm by 20 mm; the length of the short strip is about 10.8 mm; the inner gap is about 2.2 mm; the widths of long and short strips are between 1.3 and 1.5 mm. For the GPS antenna, some of the key measurements include: the length of the antenna is about 24.5 mm; the width of antenna is about 13.5 mm; the inner gap is about 0.9 mm; one length of the sub-patch for the signal is about 14.5 mm; one length of the sub-patch for grounding is about 9.0 mm.

Last, the tactile switch near the taillight socket aids in adding security to the truck or trailer and the IoT location tracking system. This tactile switch is connected to the taillight socket and vehicle harness wire plug with a spring. Since taillights need to be replaced at some point, the system would keep track of such an occurrence. Each time the device gets removed from the taillight bracket, the tactile switch detects the action and sends an event signal to the remote cloud server. This anti-theft feature not only improves the vehicle and trailer security but also adds to the better management functionalities of the overall vehicle location tracking system.

By installing the tactile switch to detect the removal of the taillight, the main system can interpret that the vehicle has been tampered with since the anti-theft tactile switch is triggered. Naturally, all location updates transmitted by a stolen device would be considered abnormal since the system has detected and distinguished the device's disconnection as a result of intentional tampering rather than a power failure, replacement, maintenance, or loss of cellular signal. This is aided by the battery pack keeping the taillight on after being removed. It will presumably keep the taillight running for a long time and continue to receive GPS and cellular signals. Once detected, the vehicle or taillight can be tracked more easily and recovered. The tactile switch helps to identify the device failure between the stealth or intentional tamper and other hardware damages or malfunctions.

Also, the new designs of the FPC cellular and GPS antennae make installation easier. The circumference of the LED PCBA matches the design of the FPC cellular antenna, and there is a designated frame on the LED PCBA that provides a guide for the placement of the cellular antenna's ground plane. Overall, the antenna and signal groundings are improved too. By using FPC antennae, plastic material, and separate LED/antenna and digital processor boards, the present disclosure has achieved a low cost in pricing and reduced difficulty in installation and maintenance.

The wireless command and data connection between the tracking device and the processing server are also protected against cyberattacks and data loss failures. In one exemplary embodiment of the present disclosure, this is achieved by implementing a software protocol. The protocol includes data packet encryption, device identification, data packet sequence ID, data loss detection, and lost data retransmission. Each transmission packet is encrypted using standard AES encryption methods; each tracking device has a unique identification number within or across location tracking systems; each data packet in transmission also has a unique identification number during a certain period; the packet ID can be used to identify when data loss is happening; a configurable expiring timer is used to define the data loss occurrence. Therefore, the system will resend or ask the IoT device to resend the lost data package(s).

FIG. 1 illustrates a perspective exploded view of the assembly components of a preferred embodiment of an IoT vehicle location tracking IoT taillight (100) in the present disclosure. On one end of the taillight's (100) exterior is a taillight cover (102). This cover (102) seals and covers the interior taillight components and protects them from the outer elements such as dust and moisture. The cover (102) is made from a transparent PC (polycarbonate) material using a special mold. The other exterior component of the taillight (100) is the housing (120) at the base, which is formed in a similar manner (i.e., PC materials in a special mold) as the cover (102). This component (120) houses the interior taillight components. The housing (120) has an inward connector socket (122) along the housing's (120) sidewall that can attach to the vehicle's taillight connector (138). The socket (122) is located beside the processor PCBA (118) and the battery (116). The taillight connector (138) normally has three holes (144) for plugging. The matching pins (140) are located inside the connector socket (122) and soldered on the soldering pads (132) on the rear side of the LED PCBA (108). Once the connector (138) is plugged into the connector socket (122), the whole vehicle location tracking IoT taillight (100) will get a power supply to operate and charge the built-in battery (116). The interior of the housing (120) also contains space for inserting and replacing a SIM card, as well as facilitating software updates and function settings.

Several interior components contribute to the function of the taillight (100). In one exemplary embodiment of the present disclosure, the LED PCBA (108) is composed of ten LED lights (112), the GPS module with antenna (110), a female PCB connector (114), a frame (136) for ground plane attachment, connecting soldered pads (132) for the connector pins (140), and rear soldered pads (134) for the anti-theft tactile switch (130). A cellular antenna (104) made of FPC material attaches onto the side of the LED PCBA (108) using adhesive on the FPC cellular antenna's (104) backside. The ground plane (142) is mounted onto a frame (136) marked on the LED PCBA (108). The antenna (104) connects to a coaxial cable (106) via a soldered ground point (124). The cable (106) has a UF.L RF connector (126) that attaches to an analog RF component of the processor PCBA (118). The cable (106) fits through small spaces along the LED PCBA (108). A battery pack (116) supplies power to the taillight (100) and keeps it on for a long time. A limit and height limit fence holds the battery pack (116) in place. The processor PCBA (118) is located behind the battery pack (116) and contains all of the processor components for analog RF and digital functions. The components face the base of the housing (120) to not interfere with the battery pack (116); this will be mentioned later in future paragraphs. The analog RF components receive electric currents from RF signals via their connection with the coaxial cable (106); this will be explained in future paragraphs and in FIG. 2. Like the battery pack (116), a limit and height limit fence hold the board (118) in place. The male PCB connector (128) of the processor PCBA (118) connects to the female PCB connector (114) of the LED PCBA (108). An anti-theft tactile switch (130) is located along the sidewalls of the housing (120) below the socket (122). The switch (130) has the same depth as the socket (122), which allows the switch (130) to connect to the LED PCBA (108) via the rear soldered pads (134) directly.

All of the interior components can fulfill the purpose of the taillight (100) in the present disclosure while saving space to fit in its compact design. For example, the processor PCBA (118) and battery pack (116) are smaller than the housing's (120) diameter to fit near its base. In addition to being more compact, the sizes help with the processor PCBA's (118) placement within the taillight (100) to improve RF shielding; this will be examined further in later paragraphs. The smaller sizes of the processor PCBA (118) and battery pack (116) also allow the coaxial cable (106) to go through and attach to the processor PCBA (118) without issues with the cellular signal. Their sizes also mean that the socket (122) and anti-theft tactile switch (130) can fit along the side of the housing (120) walls to connect with the LED PCBA (108) directly.

The coaxial cable (106) can bend to fit with the shape of the taillight (100) without interference with cellular signals. The attached U.FL RF connector (126) is ideal in this embodiment since it has a miniature design that aligns with the compact design of the taillight (100).

The LED PCBA (108) is the same diameter as the housing (120). Small openings allow the coaxial cable (106) to slip through to attach to the processor PCBA (118). The size of the LED PCBA (108) can also play a role in the RF shielding of the processor components. The board's (108) size also has a large area for spacing out smaller LED lights (112) for better heat dissipation and for mounting a ground plane (142) on its frame (136); this will be explained in future paragraphs and in FIG. 4.

The antenna (104) has a fixed size. However, it can still fit within the taillight (100) due to its flexible nature and does so around the edge of the LED PCBA (108). Its flexible nature also means that it is easier to install along the front of the taillight (100). Additionally, the dimensions of the antenna (104), particularly the copper layer, make the taillight (100) more sensitive to radio waves from RF signals. This will be explained in future paragraphs and in FIGS. 4 and 5.

Since the placement of the LED PCBA (108) is in line with the edge of the mounting bracket, no metal component (i.e., mounting bracket) shields the GPS module with an antenna (110). This GPS antenna (110) is more sensitive to satellite signals. In this exemplary embodiment of the present disclosure, the GPS module (110) is embedded with a built-in GPS antenna. In an alternative embodiment of the present disclosure, a separate ceramic GPS antenna is attached to the GPS module. The GPS antenna is installed at the location (110). The GPS module can be a dedicated GPS chip mounted in the LED PCBA (108) or the processor PCBA (118). The GPS module can also be incorporated together with the cellular module in one single chip. Yet, in another exemplary embodiment outlined in the present disclosure, a separate FPC GPS antenna is placed even closer to the front and attached to the taillight cover (102); this will be explained in future paragraphs and in FIG. 3.

While traditional tracking devices would place the antenna with the processor components, the FPC cellular antenna (104) in the present disclosure is placed on the LED PCBA (108) outside of the metal mounting bracket. Since the antenna is placed in an area with more exposure to RF signals, its reception of RF signals will be more reliable and stronger. Moreover, the frame for ground plane attachment (136) on the LED PCBA (108) allows the antenna (104) to position itself in a way that further increases the sensitivity to RF signals through improved grounding; this will be later mentioned in further details.

The pins from the male PCB connector (128) of the processor PCBA (118) insert into the female PCB connector (114) of the LED PCBA (108). This connection is primarily made so that the processor PCBA (118) obtains the electrical power from the LED PCBA (108), which is provided by the latter board's (108) connection to the taillight connector (138). Additionally, the PCB connectors (114, 128) of both boards (108, 118) allow for data transfer and communication between the processor components and the GPS module (110) in one of the exemplary embodiment of the present disclosure. Since the GPS module (or GPS antenna) (110) and the cellular antenna (104) are placed separately from the other processor components, there is more space on the processor PCBA (118) to distribute the other processor components. This spacing on the processor PCBA (118) can prevent cramping of the components on one board, which ensures that the functions of the components do not interfere with each other. It also makes the soldering and assembly of such components easier. The large area grounding and heat dissipation can also be attributed to extra spacing thanks to the use of two PCBAs instead of one.

The battery pack (116) can charge while the vehicle is operating, like with existing taillight designs. This is done via the vehicle's taillight connector (138), holes for pins (144), and associated pins (140). The battery (116) can keep the taillight (100) and the processor components running for several hours after the vehicle is turned off. This is beneficial for keeping track of a vehicle that is parked and stationary. More importantly, the battery pack (116) works with the tactile switch (130) if the vehicle or taillight (100) is stolen; this will be mentioned further in FIG. 6. The battery pack (116) has five cells in the present disclosure. In an alternative embodiment, this battery pack (116) can have a different number of cells. This modification may affect the voltage supplied to the taillight (100). It may also affect the duration time of the taillight's (100) power and tracking system functions after the device (100) is no longer supplied with electrical power. In yet another embodiment, the battery pack (116) may have a cover that acts as a weather seal. This seal could better shield the battery pack (116) from moisture or dust if there is a crack in the housing (120).

The connector (138) in the preferred embodiment is designed with three holes for pins (144). However, other embodiments contemplate the use of a connector (138) with four or six holes for pins; this will ultimately depend on the vehicle itself. In yet another embodiment, the pins (140) can be assigned to different functions of the taillight (100), such as braking or signaling.

The taillight (100) in the preferred embodiment of the present disclosure is shown and described as being circular in shape. Other embodiments may have a different shape, including, but not limited to, elliptical, rectangular, triangular, etc. In yet another embodiment, the taillight (100) can be a 6-inch light. Likely the most significant change would be the shape and design of the antenna (104), which would be modified to accommodate the shape of the taillight. The LED lights (112) may also be spaced differently to handle heat dissipation.

Figure 2:
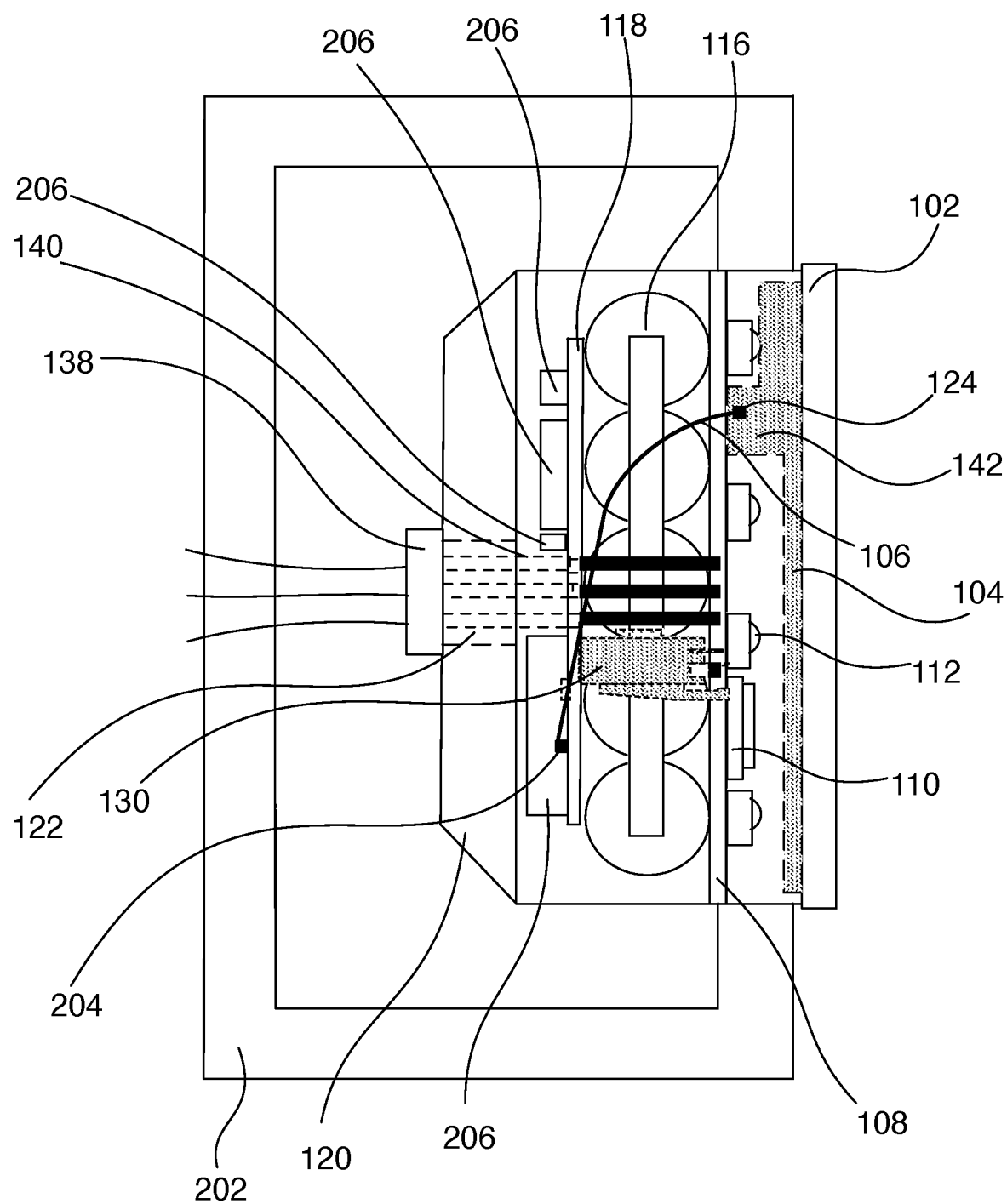
FIG. 2 illustrates a cross-sectional view of a preferred embodiment of the IoT vehicle location tracking taillight in the present disclosure.

FIG. 2 illustrates a cross-sectional view of a preferred embodiment of the IoT vehicle location tracking taillight In the present disclosure. All descriptions of FIG. 1 apply here. This figure also illustrates the mounting bracket (202), which is made of metal and fits the taillight in place. The 3-pin connector (138) that connects to the taillight is also located within the bracket (202). The coaxial cable (106) of the antenna (104) is connected to the antenna socket (204) of one of the processor components (206), like a cellular modem. These processor components (206) face inwards towards the base of the housing (120).

In addition to its protective function, the taillight cover (102) contains an array of tiny convex lenses. The tiny lenses have various selected focal lengths that convert the inner point lights from the regular light sources (LEDs) to an external visible light dispersed in all directions. This design allows the light from the LEDs (112) to be seen by others, which increases the visibility of the vehicle.

The processor components (206) in the present disclosure include the following: a cellular modem connects the antenna (104) to a cellular network via the coaxial cable (106); the power management module controls energy used by taillight components, monitors power levels, and controls the illumination of the LED lights (112); the microcontroller (MCU) controls function, operation, and the data flow of the GPS module with embedded or detached antenna (110); the external flash memory stores working data, parameters, the status of other processor components, and received location data from the GPS module with embedded or detached antenna (110); the accelerometer uses motion sensors to measure the acceleration of the vehicle, and is possibly connected to the microcontroller. All these components face the base of the housing (120), which contributes to two things. One, the components will not interfere with the battery pack (116) so that it and the processor PCBA (118) can be closely fitted near each other within the taillight design. Second, and more importantly, the positioning of the processor components helps better shield the components from RF waves. This will be explained in future paragraphs.

In other embodiments of the present disclosure, there could be other processor components in the taillight design. Sensors and detectors (heat, moisture, etc.) can add information regarding environmental conditions of the location (s) traveled. Detection sensors for motion can improve driving habits but can also track the vehicle in case of an accident. It should be noted that additional components may lead to cramping on the PCBA (118) itself, and a larger board may be required to accommodate these components. This may compromise the compact design. For example, these extra components may hinder the anti-theft tactile switch (130) and socket (122).

As noted before, the processor components (206) face the base of the housing (120) for improved shielding from electromagnetic signals. Since these components (206) are more involved with the storage and transfer of data, they generally do not rely on these signals as much as the GPS and cellular antennae. Moreover, some of the processor components (206) may not function properly due to interference if directly exposed to electromagnetic waves. Therefore, placing them in the metal bracket isolates the components (206) from their surroundings, which reduces the coupling of radio waves, electromagnetic fields, and electrostatic fields. The bracket (202) generally lowers the electromagnetic field in a given area by barricading it with the metal material. As a result, any data stored in the processor components (206) are protected thanks to the shielding. Furthermore, the shielding may help prevent hacking of the digital components and the system since the interference could prevent access to data. Overall, the GPS location and data regarding the vehicle can be consistently available to the server.

In an alternative embodiment, the mounting bracket (202) may be made of a different metal, which may vary in terms of permeability, thickness, or conductivity of the material. Common materials that could be used include steel, iron, aluminum, or copper. All are considered good for absorbing radio and electromagnetic waves. In another alternative embodiment, the bracket (202) has a coated layer of metallic ink. This layer is applied situationally if the bracket (202) material does not sufficiently provide RF shielding. In yet another alternative embodiment, the bracket (202) has holes to allow heat to escape. However, this may compromise the ability to shield the taillight from RF signals. It would also expose the taillight to dust and moisture.

Figure 3:
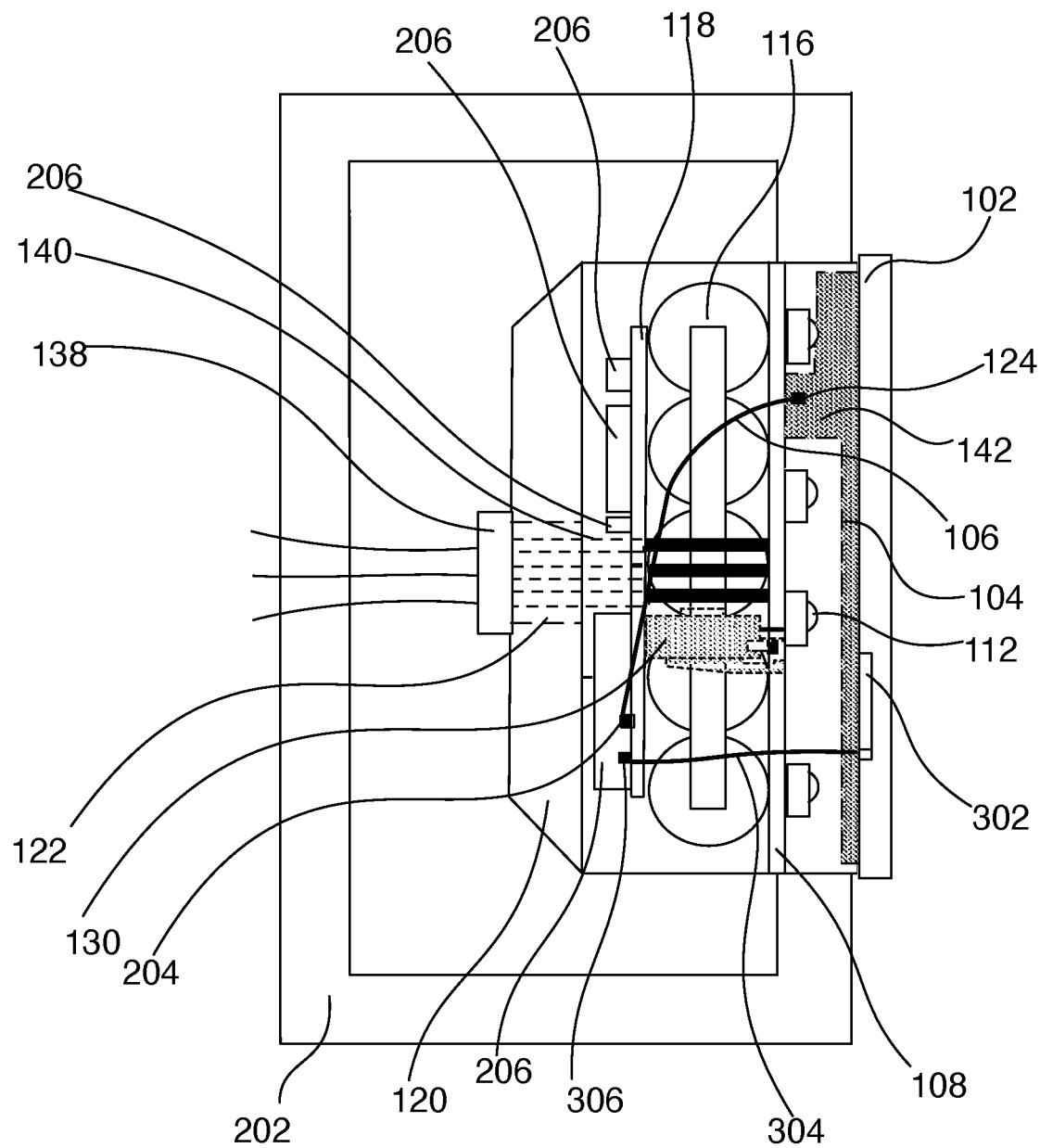
FIG. 3 illustrates a cross-sectional view of an alternative embodiment of the IoT vehicle location tracking taillight in the present disclosure.

FIG. 3 illustrates a cross-sectional view of an alternative embodiment of the IoT vehicle location tracking taillight in the present disclosure. The GPS module and antenna are now separated. The GPS module is placed on the processor PCBA (118) along with the other processor components (206). The GPS antenna in the preferred embodiment is replaced with an FPC GPS antenna (302), which is placed on the taillight cover (102) with adhesive. This antenna (302) connects to the input terminal (306) of the GPS module via a small GPS RF coaxial cable (304). The input terminal (306) is located below the antenna socket (204). All other descriptions of FIGS. 1 and 2 apply here.

The placement of the FPC GPS antenna (302) in this alternative embodiment means that it can better receive GPS satellite signals compared to the preferred embodiment because the antenna (302) is entirely outside of the metal mounting bracket (202). Also, the FPC GPS antenna (302) is separated from the LED PCBA (108) with a coaxial signal cable (304) connection.

The GPS module (110) can now be placed on the processor board (118). Though the input is directly below the antenna socket (204), the GPS module (110) is either a separate component (206) or connected to the MCU. As noted before, the MCU has a role in the flow of GPS data. The GPS RF cable (304) serves as a connection between the GPS components (302, 306). Like the coaxial cable (106) for the FPC cellular antenna (104), the GPS RF coaxial cable (304) can bend and twist along the shape of the taillight without interference to the transfer of signals.

Unlike the FPC GPS antenna (302), the GPS module (110) is normally considered a processor component (206), so it does not need exposure to satellite signals. On the contrary, the GPS module (110) can be affected by spurious electromagnetic interference in the air like the other processor components (206). Therefore, placing the processor PCBA (118) near the base of the housing (120) makes it function better and consistently due to the improved RF shielding.

One limitation of this design is that the FPC GPS antenna (302) cannot block the LED light (112). Therefore, it is restricted in shape and size. This shape and size restriction may limit its design flexibility and performance to receive GPS satellite signals. Therefore, to operate effectively and keep consistent communication with GPS satellites, there needs to be a fixed spacing within the taillight and no material devices under FPC GPS for effective operation. This will be explained later in future paragraphs and in FIG. 5.

Another limitation is that the adhesive on the back of the FPC GPS antenna (302) may eventually peel off the cover (102). In another embodiment of the present disclosure, injection molding can be done over the FPC GPS antenna (302) when manufacturing the cover (102). This not only allows the FPC GPS antenna (302) to stick onto the cover (102) for longer but also allows for more consistent and reliable performance due to the antenna's (302) consistent placement on the cover (102). If the FPC GPS antenna (302) needs replacement, then the cover (102) must be replaced as well. One embodiment that could solve this is to make an empty slot on the cover (102) for the FPC GPS antenna (302) to be held snugly into place.

Figure 4:
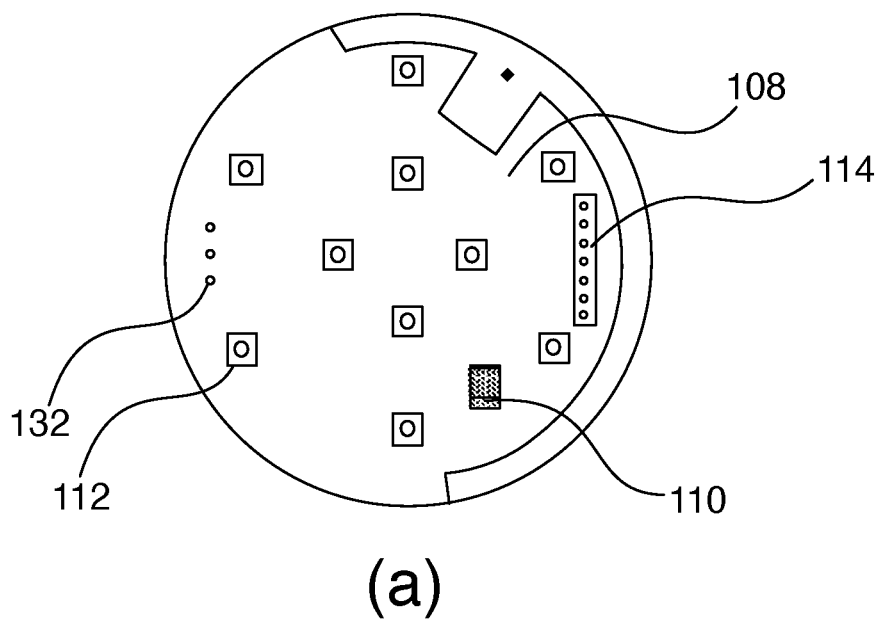
FIG. 4 illustrates top views of the LED lighting PCBA of the preferred and alternative embodiments of the IoT vehicle location tracking taillight in the present disclosure.
Figure 4:
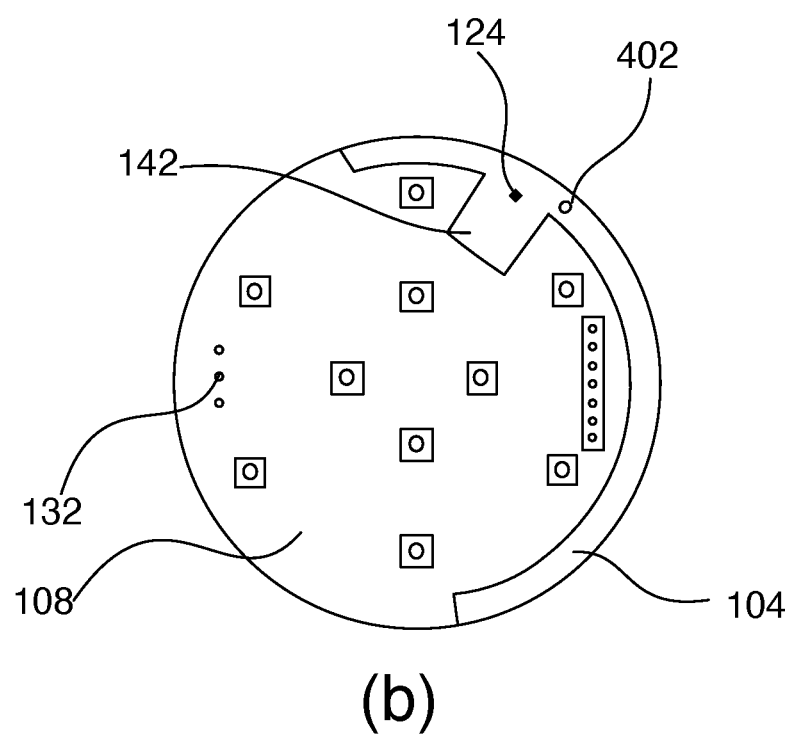

FIG. 4 illustrates top views of the LED lighting PCBA of the preferred and alternative embodiments of the IoT vehicle location tracking taillight in the present disclosure. Sub-figure (a) illustrates the top view of the LED PCBA of the preferred embodiment of the present disclosure. The descriptions of the LED PCBA (108) and its components in FIG. 1 also apply here. The sub-figure illustrates exemplary ten LED lights (112) spaced out in an evenly distributed manner: four are vertically placed along the middle of the LED PCBA. Six LED lights (112) are placed in a diagonal fashion, forming an X in the middle of the LED PCBA (108). This configuration of LED lights (112) is one example of how they can be arranged; however, it is ultimately up to the vehicle manufacturer to determine the number of LED lights (112) and their arrangement on the LED PCBA (108). The tracking device of the present disclosure may just simply follow their taillight design.

Sub-figure (a) also illustrates the precise location of the other components on the LED PCBA (108): the GPS module with antenna or a detached GPS antenna (110) on the bottom right, the female PCB connector (114) on the right, and the connecting soldered pads (132) for the connector pins on the left. This sub-figure also shows the FPC cellular antenna (104) mounted along the right edge of the LED PCBA (108). The protruding ground plane (142) of the cellular antenna (104) attaches to the LED PCBA (108), which covers a frame that marks the ground plane's (142) placement. The description of the cellular antenna (104) in FIG. 1 also applies here. The cellular antenna (104) has a soldered ground point (124), which attaches to a coaxial cable linked to a processor component. This ground point (124) connects to a soldered signal point (402), also known as a feed point. For consistency, (402) is hereafter referred to as the soldered signal point. The relationship between the signal point (402) and ground point (124) will be examined later in future paragraphs and in FIG. 5.

Sub-figure (b) illustrates the top view of the LED PCBA of the alternative embodiment of the present disclosure. The main difference is that the GPS module with antenna or detached GPS antenna (110) in Sub-figure (a) is now removed in favor of the FPC GPS antenna. All descriptions of the other components from Sub-figure (a) apply here.

For the cellular antenna (104) to optimally and consistently operate, it needs to be a fixed size. However, the antenna's (104) flexible nature allows it to wrap around the LED PCBA (108). Not only does this take up less space to fit with the taillight design, but it is also far easier to install. The antenna placement on the PCBA (108) does not interfere with the LED lights (112) or GPS components (110) since they do not directly interact with each other. In the case of the LED lights (112), the tracks or traces do not touch the cellular antenna (104). More importantly, its placement outside of the processor PCBA (108) means that the antenna (104) is more exposed and more sensitive to RF signals. In an alternative embodiment of the present disclosure, the cellular antenna (104) is placed along the walls of the taillight cover. In doing so, the cellular antenna (104) will be even more sensitive to RF signals due to less interference from the metal mounting bracket.

The LED lights (112) have several advantages over incandescent ones in a taillight. The LED lights (112) save space due to each LED light's (112) small size. One possible factor is that there is no longer a need for a parabolic reflector in the taillight that was present in previous incandescent designs. The LED lights (112) are also more efficient and can last longer than incandescent ones. However, LED lights (112) produce substantial heat, which is detrimental to the life expectancy of the LEDs (112) and possibly the taillight itself. Overall, this heat leads to weakened lights, possible physical deformation of components, and malfunction of processor components.

Regardless of the manufacturer's quantity, the LED lights (112) in the present disclosure should be spaced apart to better deal with heat dissipation, a type of heat transfer. This placement of the lights (112) may help with radiating heat away from the taillight. The arrangement of the LED lights (112) should also allow for a large space to implement the ground plane (142), which can act as a type of heat sink. Using the ground plane (142) to accommodate heat dissipation requirements eliminates the need for extra components needed for heat dissipation that may compromise the compact design of the taillight.

In an alternative embodiment of the present disclosure, the LED PCBA (108) can be made of a material with superior thermal properties such as polyamide or metal-core boards. This allows heat to be further dissipated as the board (108) acts as an additional heat sink. This also eliminates the need for additional components for cooling.

More importantly, the heat is eventually converted into electromagnetic waves via thermal radiation. This occurrence affects the taillight of the present disclosure in several ways. First, the cellular antenna (104) is in direct contact with the converted electromagnetic waves. In addition to radio waves from external RF signals, the cellular antenna (104) also receives electromagnetic waves from thermal radiation. The increased sensitivity of the cellular antenna (104) in the present disclosure picks up these signals as noise, which creates interference with useful cellular communication. It should be noted that the impact of increased exposure to GPS satellite signals by putting a GPS antenna on the LED PCBA (108) outweighs the possible electromagnetic interference generated on the LED PCBA (108). Nonetheless, the alternative embodiment of the present disclosure solves this by moving the GPS components (110) away from the interference caused by these electromagnetic signals on the LED PCBA (108). The GPS antenna is moved to the taillight cover, which is better since it is distant from the high current thermal signal created by the LED PCBA (108). Meanwhile, the GPS processing module (110) is moved to the processor PCBA, which is shielded from this and all other external interference, as it is deep inside the metal mounting bracket. Likewise, the base of the housing also shields the processor components, so they are also not greatly affected by the electromagnetic signal created by thermal radiation. The coaxial cable that attaches the GPS components (110) is also shielded, which also helps with preventing interference with the transfer of GPS data. This will be explained later. Overall, if the heat is properly dissipated or transferred, the taillight can have a longer life expectancy.

In addition to its role in heat dissipation, the ground plane (142) helps prevent electromagnetic interference on the LED PCBA (108), which allows the LED lights (112) and the other components to operate without disturbance. Furthermore, the ground plane (142) can prevent crosstalk of components on the LED PCBA (108), which is defined as the unintentional coupling of such traces that causes undesirable effects. The open spacing on the LED PCBA (108) also allows the ground plane (142) to be larger; this will be explained in future paragraphs and in FIG. 5. This spacing also increases with the removal of the GPS module with antenna or detached antenna (110) in Sub-figure (b).

Figure 5:
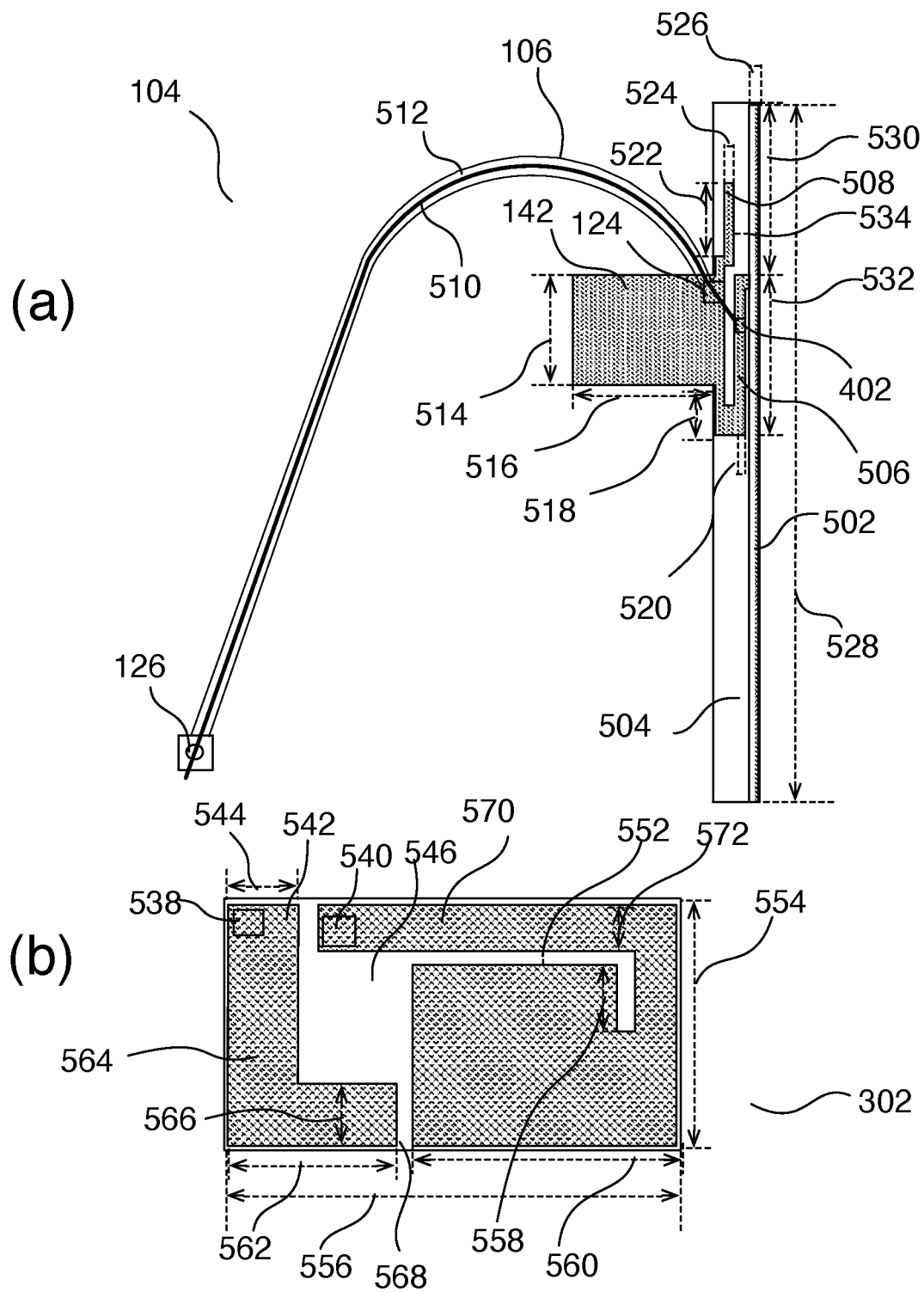
FIG. 5 illustrates a preferred custom-designed FPC cellular antenna embodiment and alternative GPS antenna embodiment of the present disclosure.

FIG. 5 illustrates a preferred custom-designed FPC cellular antenna embodiment and alternative GPS antenna embodiment of the present disclosure. Sub-figure (a) illustrates the FPC cellular antenna design of the preferred embodiment of the present disclosure. All descriptions of the cellular antenna (104) from previous figures also apply here. The cellular antenna (104) generally contains a conductive copper layer and an insulating substrate layer (504) made of plastic or polyester. The back of the antenna (104) has adhesive, which allows the antenna (104) to attach to the LED PCBA. The length of the antenna (104), which fits around the edge of the LED PCBA, has a dimension of 102 mm (528). There is also a protruding ground plane (142) perpendicular to the antenna's length (528) with a length of 16.0 mm (514) and a width of 20.0 mm (516). The ground plane (142) also attaches to the LED PCBA as a ground terminal along its top right.

The FPC cellular antenna (104) is attached to a coaxial cable (106). This cable (106) is soldered onto a pad of the antenna (104), known as the soldered ground point (124). The cable contains a center conductor (510) layer made of copper and an outer layer (512) that contains an outer jacket and foil shield. The center conductor (510) is exposed between the soldered ground point (124) and the soldered signal point (402).

The cellular antenna's (104) copper foil layer consists of multiple sections. Along the antenna's length (528), there is a long strip known as the long radiating strip (502). It has a length of 102 mm (528) and a width of 1.5 mm (526). The feeding strip (506) is an intermediate between the two soldered points (124, 402), bending into a C-shape on the substrate layer (504) for this contact. The feeding strip (506) has a top length of 23.5 mm (532), a width of 1.6 mm (520), and a bottom length of 4.5 mm (518) that meets with the ground plane (142). From the soldered ground point (124), there is a protruding strip known as the short radiating strip (508) with a width of 1.3 mm (524) and a length of 10.8 mm (522). There is also a gap (534) between the long (502) and short (508) radiating strips. This gap (534) has a width of 2.2 mm.

The copper layer is divided into the radiating and feeding strips to maintain a receptive and consistent cellular signal. The radiating strips (502, 508) help with lower frequency operations, while the feeding strip (506) helps with higher frequency operations. Adjusting the size of these copper layer strips (502, 506, 508) can affect the operating range of bandwidth for the antenna (104). Notably, the radiating strips (502, 508) also help increase antenna gain from RF signals. Longer radiating strips mean that the cellular antenna (104) can obtain weaker RF signals from a farther distance while converting those signals into stronger electrical currents via the coaxial cable (106). Therefore, if the cellular antenna (104) and its copper foil layer have a larger surface area and longer dimensions, the antenna (104) will be more sensitive to RF signals and obtain higher gain, leading to a stronger cellular signal.

In addition to the copper layer itself, the width between the radiating strips (502, 508) can affect the coupling strength and impedance matching in the antenna (104). Coupling is defined as the transfer of energy from one medium or circuit to another. The impedance is defined as the opposition or resistance to the electrical current when there is a voltage. Improved impedance matching, where the input and output impedances differ, can obtain a wider operating bandwidth for the antenna (104) and affect its overall performance. Overall, it can cover a broader range of network frequencies to work more optimally in environments with poorer reception.

As noted before, the ground plane (142) provides a coupling ground wire connection as a way to improve grounding performance, and ultimately, improve sensitivity to RF signals. This is mainly because the ground plane (142) helps reduce electrical noise and interference in the taillight, such as when signals are transferred to the PCBAs. This helps prevent overlap between signals and makes signal transfer more efficient. The ground plane (142) prevents crosstalk between circuit board traces, which also makes the signal transfer more efficient. In addition to its primary benefits, the ground plane (142) also prevents electrostatic discharge, which is the sudden flow of electricity that may affect the function of other components in the taillight or even cause total operation failure. The large area of copper in the ground plane (142) conducts return currents from the other components without dropping the voltage. Thanks to the larger dimensions of the ground plane (142), as shown in Sub-figure (a), the antenna (104) will have an increased gain, leading to overall higher sensitivity to RF signals. Because the ground plane (142) makes a clear return path for the signals and prevents a drop in voltage, the electrical signal sent to the processor PCBA remains consistent for stronger cellular communication.

The preferred embodiment of the present disclosure uses a substrate layer made of plastic or polyester due to its flexibility, lighter weight, and cheap cost. In an alternative embodiment, the cellular antenna (104) is made with a ceramic material. By doing this, it is better able to maintain structural stability with high temperatures from LEDs (112) and is less prone to dielectric loss. However, ceramic is more permeable to radio waves from RF signals, which may affect the bandwidth and overall sensitivity of the antenna (104).

The coaxial cable (106), in the preferred embodiment of the present disclosure, is a type of transmission line that carries high-frequency electrical signals from one end (i.e., cellular antenna (104)) to the other (i.e., antenna socket). It is classified as an unbalanced line that requires a conductor in the form of a grounding point, such as the ground plane (142) in the present disclosure. The coaxial cable (106) is ideal for radio frequency signals for several reasons: 1) it can be bent or twisted without any adverse effects on the transferring signal. This allows the cable (106) to connect to the processor PCBA without requiring extra space outside the taillight design. Moreover, there is less interference in the signal transfer since the electromagnetic field carrying the signal is typically kept within the space between inner and outer layers (510, 512) with little leakage. Furthermore, electric and magnetic fields outside the cable do not affect the signal it sends. Unlike other shielded cables, there is constant conductor spacing in the coaxial cable (106). This spacing makes the signal transfer more efficient.

In another exemplary embodiment of the present disclosure, the coaxial cable (106) can be modified in a variety of ways. Such modifications may change the electrical properties of the cable (106). For example, the center conductor layer (510) can be braided, which would allow the cable to be more flexible; however, there could be gaps in the outer layer (512) that may affect the signal transfer. This modification may also affect the size of the cable (106) since the inner dimension is altered. Another embodiment can use alternate materials for the center conductor layer (510), which could include copper-plated steel or a conductive metal that is silver plated. The type of metal used will affect the conductivity of the electrical signal sent through the transmission line; however, silver-plated wires are known for their capability of handling even higher frequencies.

Other embodiments could also involve changes to the outer layer (512), particularly the outer jacket used for insulation. This layer is typically a solid plastic as it is in the present disclosure; however, foam plastic or plastic with spacers can also be used to affect the electrical properties. The type of plastic may also vary, which include but are not limited to polyethylene, plenum-rated insulators, or Teflon.

In yet another embodiment, the cable (106) could use a different type of RF connector in place of the U.FL RF connector (126), such as the SMA connector. One advantage that this connector has over the U.FL RF connector (126) is its ability to reconnect multiple times due to its screw-type coupling. The U.FL RF connector (126) is only designed for a few reconnects before replacement is required, and they are not typically sold separately from the coaxial cable (106). This makes repairs and maintenance more difficult. However, SMA connectors are larger when compared to the miniature U.FL RF connector (126). Using a different type of connector, such as the one mentioned above, may compromise the taillight design due to their size.

In yet another exemplary embodiment, a different type of transmission line can be used instead of the coaxial cable. The more common alternatives would include planar lines and balanced lines. PLANAR LINES: The transmission lines consist of flat lines with conductors or strips. Such transmission lines may include the microstrips (coupling and feeding strips (502, 506, 508)) of the antenna (104) in the present disclosure. Some of the advantages include their smaller size, increased reliability, low cost, easier mounting, possible passive circuit design, and better control of impedance. However, these lines have a lower power-handling capability, increased radiation loss, and a precise requirement for circuit design. For this type of transmission line, direct contact with the processor PCBA is required. The transmission line, and therefore, the antenna (104) would need to be on the processor PCBA. As a result, the antenna (104) would have sub-optimal sensitivity to RF signals due to the shielding of the metal mounting bracket; BALANCED LINES: This type of transmission line involves a cable much like the coaxial cable (106) of the present disclosure. However, the balanced line has two conductors with matching impedances along its length, as'well as along the ground and other circuits. The two most common types are twin-lead for radio frequency signals (high) and twisted pair for lower frequencies. Overall, the balanced line is suitable for blocking out external noise that may interfere with the signal transfer.

Sub-figure (b) illustrates the FPC GPS antenna design of the alternative embodiment of the present disclosure. It is shown in a horizontal fashion. For reference, the dimension of length is horizontal, and the dimension of width is vertical. The FPC GPS antenna (302) has a width of 13.5 mm (554) and a length of 24.5 mm (556). The copper layer is divided into two L-shaped patches: a grounding sub-patch (564) to the soldered ground point (538) and a larger signal sub-patch (570) for the soldered signal point (540). The substrate layer dividing the two sub-patches (564, 570) includes an ample space (546), two dividing gaps (568), and a small L-shaped gap (552) between the top and bottom of the signal sub-patch (570).

The signal sub-patch (570) connecting to the soldered signal point (540) has a top width of 2.5 mm (572) and a bottom length of 14.5 mm (560). The small L-shaped gap (552) between the top and bottom portions of the signal sub-patch has a dimension of 0.9 mm. Also, the bottom portion of this sub-patch (570) adjacent to the end of this L-shaped gap (552) has a measurement of 3.6 mm (558).

The grounding sub-patch (564) is where the satellite signals get transferred to the processor components via a transmission line. The copper layer of this sub-patch (564) has a bottom width of 3.4 mm (566) and a bottom length of 9.0 mm (562). The sub-patch (564) ends at the soldered ground point (538) and a ground plane (542) with a width of 4.0 mm (544). The soldered ground point (538) would connect to a transmission line like the GPS RF coaxial cable shown in FIG. 3.

The FPC GPS antenna (302) is shown horizontally in Sub-figure (b); however, it can be placed vertically or horizontally on the taillight cover since it does not have to conform to any particular shape. However, it is more important to determine where exactly should the antenna (302) be placed on the cover; this will be explained later in future paragraphs.

The FPC GPS antenna (302) receives GPS satellite signals in a similar way that the cellular antenna (104) receives its RF signal. They both use conductive copper layers on top of the insulating substrate layers (504, 546, 552, 568), where their respective signals travel towards a coaxial cable that serves as the transmission line. The coaxial cables of both antennae in the present disclosure lead to particular processor components on the processor PCBA. This allows for faster transmission of GPS and cellular signals due to its direct connection to that circuit board. Both antennae (104, 302) are also placed in a way that does not interfere with the function of the other components in the taillight, mainly the LED lights.

The GPS antenna ground plane (542) functions similarly to that of the cellular antenna (104, 142). The GPS antenna ground plane (542) ensures that the electrical signal is sent to the GPS module without interference for stronger communication with satellite signals. Although the ground plane (542) has a smaller dimension, the gain should not be greatly affected because the FPC GPS antenna (302) is placed outside of the metal mounting bracket.

In regards to gain, the copper layer sub-patches (564, 570) have a role in increasing gain the way that the radiating strips (502, 508) of the cellular antenna (104) do. Because the sub-patches (564, 570) make an L-shape around the corners of the FPC GPS antenna (302), their lengths mean that the gain of satellite signals is increased. The widths of the sub-patches indicated at various points (558, 566, 572) also play a role in the increased sensitivity and gain. Thanks to the modified design of the copper layer of this antenna (302), it can pick up weak GPS satellite signals and convert them into strong electrical signals that are transferred to the GPS module.

The FPC GPS antenna (302) requires a resonance frequency of 1575.24 MHz to operate effectively. This resonance frequency is where the capacitance and inductance created by the antenna cancel out, making the antenna resistive to energy loss and radiation. The capacitance is defined as the ratio of change in the electric charge of the system. The inductance is defined as the property of an electric conductor or circuit that results in the generation of an electromotive force by a change in the flowing current. The size of the FPC GPS antenna (302) can influence both of these factors. For this embodiment to maintain constant communication with satellite signals, there needs to be a fixed spacing and no material devices underneath the antenna (302) to maintain resonance frequency at 1575.24 MHz. This can be done by placing the FPC GPS antenna (302) approximately above 6-8 mm from the bottom of the taillight cover. If sufficient space cannot be guaranteed, the resonance frequency can be adjusted. To make this compromise, an alternative embodiment can change the height of spacing and the antenna's (302) material; the resonance frequency of the antenna can then be adjusted, but a larger size may block the LED lights.

The FPC GPS antenna (302) has a rectangular shape in the present disclosure. In another embodiment, the FPC GPS antenna (302) can be any other shape such as a square, circle, triangle, etc. However, the FPC GPS antenna (302) still cannot block the LED lights and needs to ensure and maintain a decent resonance frequency to keep consistent communication with the GPS satellite system and network.

In yet another embodiment of the present disclosure, both antennae (104, 302) can have modified measurements of the copper layer sections, such as the strips, grounding pad, etc. These changes would ultimately modify the antenna's (104, 302) performance and its sensitivity to their respective signals. However, any modifications to the copper layer need to ultimately conform to the shape of the substrate layer (504, 546, 552) of the antennae (104, 302). There would also be a need to ensure that the antennae (104, 302) can remain sensitive enough to their respective signals.

Figure 6:
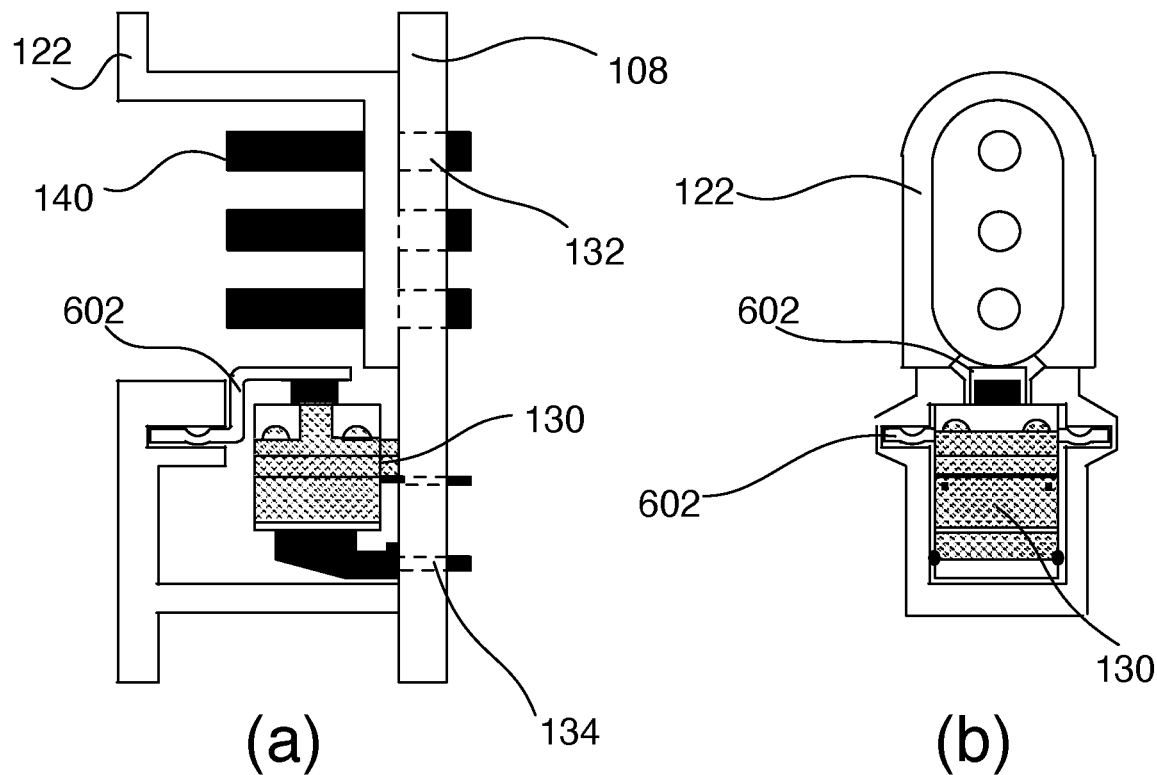
FIG. 6 illustrates a side and top view of the anti-theft tactile switch integrated with the taillight fixture, as well as a side and top view of the spring attached to the tactile switch.

FIG. 6 illustrates a side and top view of the anti-theft tactile switch integrated with the taillight fixture, as well as a side and top view of the spring attached to the tactile switch. Sub-figure (a) illustrates the side view of the anti-theft tactile switch integrated with the taillight fixture. The switch (130) is below the socket (122) of the taillight. Both the taillight connector pins (140) and the switch's (130) own pins make contact with the LED PCBA (108). The connector pins (140) are inserted through the connecting solder pads (132) to supply power to the LED PCBA (108) and the rest of the taillight. The switch (130) connects to individual soldered pads (134) at the rear of the LED PCBA (108). A spring (aka. contact or terminal) (602) keeps the tactile switch (130) in place at the base of the taillight housing. This spring (602) holds down a plunger-like button on the top of the switch (130); this button will rise when the taillight is removed and stolen to indicate tampering with the vehicle. In other words, the switch (130) acts as a chip TAMPER functional structure.

Sub-figure (b) illustrates a front view of the anti-theft tactile switch integrated with the taillight fixture. The descriptions of the switch (130), spring (602), and socket (122) also apply here. The sub-figure mainly illustrates the springs (602) attached to the side of the allotted space below the socket (122). Sub-figure (c) illustrates a side and top view of the spring (602) attached to the tactile switch. It is made of metal and kept in place within the housing base, as seen in Sub-figure (a).

The function of the anti-theft tactile switch (130) is dependent on the other components of the taillight. The switch (130) makes a connection to the soldered pads (134)

at the rear of the LED PCBA (108). Since this PCBA (108) directly receives power from the connector (138) and associated pins (140), its power status is also communicated to the switch (130), which records that the taillight is on and attached. However, the switch (130) itself does not communicate this to the main system. Rather, it communicates with one of the processor components on the processor PCBA to specifically indicate that the taillight is unplugged. When the taillight is installed in the vehicle, the switch is considered to be in an 'ON' state. Upon its removal from the vehicle, the switch (130) button is released from the spring (602). This occurrence indicates that the switch (130) is considered to be in an 'OFF' state. The processor PCBA will detect this event and send an "UNPLUGGED" notification to the main system over the Internet regarding the taillight's status. This communication also happens between the processor PCBA and LED PCBA through the male/female PCB connection between the two PCBAs. If the taillight is removed, the battery helps maintain power to the whole device. As a result, there is ample time for the processor components to send information to the cloud server regarding the tamper status and where the event has happened by providing GPS coordinates. Other hardware failures can happen to the device, including but not limited to: the battery runs out of power, cellular communication is disrupted, MPU crashes, etc. In such cases, these failures are fatal and do not trigger the anti-theft tactile switch event (130). When the remote server detects a loss of this location tracking device, the server can immediately know whether the communication loss of a device without an "UNPLUGGED" notification is unrelated to the theft or removal of the device. This additional information is very useful to maintain the vehicle's safety and can debug and fix the issues of the overall system functions and performance.

One extra benefit of having this anti-theft tactile switch (130) is extra security for the tracked vehicle. Even if the thief knows that the vehicle has an integrated GPS in the taillight, they would not realize that the taillight is still being tracked even after removing the taillight, thanks to the battery pack that keeps the taillight components operating. Therefore, it may be possible for the police to track the stolen device using this extra location information and data recorded in the central tracking system to recover the vehicle or the device at a later time.

In yet another alternative embodiment of the present disclosure, the anti-theft tactile switch (130) is mounted or directly installed onto the processor PCBA instead of below the socket (122) that connects to the LED PCBA (108). Overall, the operation of the switch (130) will work as same. However, consideration of the component spacing on the processor PCBA and the height allowance inside the housing would be required to prevent overcrowding and/or inhibiting the function of the switch (130) or any other processor component.

The invention claimed is:

1. A method of tracking a vehicle's location in a wireless network, comprising:
    replacing the vehicle's existing tail light fixture with a tracking device that also works as a new tail light fixture;
        wherein the tracking device comprises an external tail light cover, lighting generation board, electricity storage device, processor board, antenna to transmit and receive signals in the wireless network, and position sensor with its antenna;
        wherein the electricity storage device, boards, antennae, position sensor, and anti-theft mechanism are all hosted inside the new tail light fixture;
        wherein the device gets power from the vehicle, and the electricity storage device gets charged by the vehicle when the vehicle is turned on, and the device gets power only from the electricity storage device when the vehicle is turned off or the device is disconnected from the vehicle;
    mounting at least one of the antennae between the external tail light cover and the lighting generation board; wherein the antenna is inside or onto the external tail light cover;
    placing the processor board further away from the external tail light cover than the lighting generation board;
    placing the electricity storage device further away from the external tail light cover than the lighting generation board;
    wherein the vehicle's location is detected by the position sensor and its antenna, and the position information is transmitted through the wireless network.

2. The method of claim 1, further comprises an anti-theft mechanism to detect theft when the tracking device loses power from the vehicle; wherein the position sensor is a GPS (Global Positioning System) receiver; the electricity storage device is a rechargeable battery; wherein at least one the antennae is made of FPC (Flexible Printed Circuit).

3. The method of claim 2, wherein the GPS antenna is integrated with the GPS receiver and mounted on the lighting generation board.

4. The method of claim 1, wherein the anti-theft mechanism comprises a tactile button switch that has a first and second connecting state; a spring presses down the switch to force it to stay in the first connecting state; wherein the spring releases and the switch changes to the second connecting state when the device is removed from the tail light fixture.

5. The method of claim 4, wherein during the second connecting state, the device is powered by the electricity storage device; the processor board receives the vehicle position coordinates from the position sensor and its antenna, transmits the position coordinates and second connecting state through the wireless network and its antenna.

6. The method of claim 1, wherein the processor board is placed further away from the external cover than the electricity storage device for maximum electromagnetic shielding and protection.

7. The method of claim 1, wherein the tracking device is communicating with a tracking server through the wireless network.

8. A method of tracking an unpowered vehicle's location in a wireless network, comprising:
    replacing the vehicle's existing tail light fixture with a tracking device that also works as a new tail light fixture, the vehicle can be removably connected to a powered vehicle and receive electrical power for the tail light fixture only from the powered vehicle;
        wherein the tracking device comprises an external tail light cover, lighting generation board, electricity storage device, processor board, antenna to transmit and receive signals in the wireless network, anti-theft mechanism, and position sensor with its antenna;
        wherein the electricity storage device, boards, antennae, position sensor, and anti-theft mechanism are all hosted inside the new tail light fixture;
        wherein the device gets electricity from the unpowered vehicle, and the electricity storage device gets charged by the unpowered vehicle when it is turned on and connected with the powered vehicle, and the device gets power from the electricity storage device only when the unpowered vehicle is turned off or disconnected from the powered vehicle, or the device is disconnected from the unpowered vehicle;

wherein the device disconnection is detected by and triggers the anti-theft mechanism;

enabling the anti-theft mechanism to detect when the tracking device loses power from the vehicle;

determining the unpowered vehicle's location as the following:

the current location detected by the position sensor and its antenna when the device always has electricity;

the last location detected by the position sensor and its antenna when the device still has electricity, but the electricity storage device is not being charged any more or the anti-theft mechanism is triggered; or the last location detected by the position sensor and its antenna when the device loses electricity; and transmitting the unpowered vehicle's location information through the wireless network whenever the device has electricity.

9. The method of claim 8, wherein at least one of the antennae is embedded inside the external tail light cover.

10. The method of claim 8, further comprises: placing the processor board further away from the external tail light cover than the lighting generation board; placing the electricity storage device further away from the external tail light cover than the lighting generation board.

11. The method of claim 8, wherein the anti-theft mechanism comprises: a tactile button switch that has a first and second connecting state; a spring presses down the switch to force it to stay in the first connecting state; wherein the spring releases and the switch changes to the second connecting state when the device is removed from the tail light fixture.

12. The method of claim 11, wherein during the second connecting state, the device is powered by the electricity storage device; the processor board receives the vehicle position coordinates from the position sensor and its antenna, transmits the position coordinates and second connecting state through the wireless network and its antenna.

13. The method of claim 8, wherein the antenna comprises:
a Flexible Printed Circuit (FPC) cellular antenna that has a long radiating strip with a length of 90-110 mm and a width of 1-2 mm; a feeding strip is bent into a C-shape on a substrate layer with a top length of 20-25 mm and width of 1-2 mm; a bottom length of 4-6 mm that meets with a ground plane; a short radiating strip with a width of 1-2 mm and length of 8-12 mm; a gap of 1-4 mm between the long radiating strip and the short radiating strip; and
an FPC GPS antenna.

14. The method of claim 13, wherein the GPS FPC antenna has a width of 10-15 mm and length of 20-30 mm; a copper layer is divided into two L-shaped patches: a grounding sub-patch for a soldered ground point and a larger signal sub-patch for a soldered signal point; the substrate layer dividing the two sub-patches includes a space, two dividing gaps, and a small L-shaped gap between top and bottom of the signal sub-patch.

15. The method of claim 14, wherein the signal sub-patch connected to the soldered signal point has a top width of 2-5 mm and a bottom length of 10-15 mm; the small L-shaped gap between top and bottom of the signal sub-patch has a dimension of 0.5-1.2 mm; the grounding sub-patch has a bottom width of 2-5 mm and bottom length of 5-10 mm.

16. An apparatus for tracking a powered or unpowered vehicle's location in a wireless network, which replaces the vehicle's existing tail light fixture with a new tail light fixture, comprising:
an external tail light cover of the vehicle;
a lighting generation board;
an electricity storage device;
a processor board;
a position sensor and its antenna;
an antenna to transmit and receive signals in the wireless network;
  wherein at least one of the antennae is mounted between the external tail light cover and lighting generation board; wherein the antenna is inside or onto the external tail light cover;
  wherein the processor board is placed further away from the external cover than the lighting generation board;
  wherein the electricity storage device is placed further away from the external cover than the lighting generation board;
  wherein the unpowered vehicle can be removably connected to another powered vehicle and receive electrical power for the tail light fixture only from the powered vehicle;
an anti-theft mechanism;
  wherein the anti-theft mechanism detects when the tracking apparatus loses power from the vehicle;
  wherein the electricity storage device, boards, antennae, position sensor, and anti-theft mechanism are all hosted inside the place where the existing tail light fixture was previously installed;
wherein the apparatus gets electricity from the vehicle, and the electricity storage device gets charged by the vehicle when it is turned on and connected with a powered vehicle if it is an unpowered vehicle, and the apparatus gets power from the electricity storage device only when the unpowered vehicle is turned off or disconnected from the powered vehicle, or the apparatus is disconnected from the unpowered vehicle;
wherein the unpowered vehicle's location is determined by the current location detected by the position sensor and its antenna when the apparatus has electricity, the last location detected by the position sensor and its antenna when the apparatus still has electricity, but the electricity storage device is not being charged any more or the anti-theft mechanism is triggered, or the last location detected by the position sensor and its antenna when the apparatus loses electricity;
wherein the position information is transmitted through the wireless network whenever the apparatus has electricity.

17. The apparatus of claim 16, wherein the position sensor is a GPS receiver; the electricity storage device is a rechargeable battery; wherein the antenna is made of FPC.

18. The apparatus of claim 16, wherein the anti-theft mechanism comprises: a tactile button switch that has a first and second connecting state; a spring presses down the switch to force it to stay in the first connecting state; wherein the spring releases and the switch changes to the second connecting state when the apparatus is removed from the tail light fixture.

19. The apparatus of claim 16, wherein during the second connecting state, the apparatus is powered by the electricity storage device; the processor board receives the vehicle's position coordinates from the position sensor and its antenna, transmits the position coordinates and second connecting state through the wireless network and its antenna; wherein processor board is placed further away from the external cover than the electricity storage device for maximum electromagnetic shielding and protection; wherein one of the antennae is embedded inside the external tail light cover.

20. The apparatus of claim 16, wherein the apparatus is communicating with a tracking server through the wireless network; wherein the data communication between the apparatus and server may be secure; wherein the position sensor receiver may be mounted on the processor board; wherein the GPS antenna may be integrated with the GPS receiver and mounted on the lighting generation board.

\* \* \* \* \*